July 6, 1954 G. D. LINE 2,682,863
VALVE TAPPET
Filed June 14, 1949

INVENTOR.
GERALD D. LINE
BY
McDonald & Feagin
ATTORNEYS

Patented July 6, 1954

2,682,863

UNITED STATES PATENT OFFICE 2,682,863

VALVE TAPPET

Gerald D. Line, Royal Oak, Mich., assignor to Eaton Manufacturing Company, Cleveland, Ohio, a corporation of Ohio Application June 14, 1949, Serial No. 99,039

6 Claims. (Cl. 123—90)

This invention relates to valve tappets and more particularly to a lightweight barrel type tappet of simple construction and fabrication.

Broadly, the invention comprehends the provision of a barrel type tappet comprising a hollow cylindrical body closed at one end and open at its other end made of cast iron and having a socket member of steel brazed in the open end of the body with means for releasing gas from the body provided between the body and socket at the brazing zone therebetween.

Although numerous tappets of the general barrel type comprising the brazing together of a cylindrical hollow cast iron body and a steel socket have been produced, none have been devoid of holes passing through either the socket or body utilized primarily for releasing entrapped gases from the hollow of the body. The instant invention through the provision of notches or the like in the mating surfaces of the socket and body to be brazed together permit of the escape of entrapped gases through the brazing material and out of the openings provided by the notches such that a substantially hermetically sealed tappet is produced effective to inhibit the passage of foreign material into the tappet body, and also provide for the production of a more economical tappet as compared to those utilizing direct unobstructed openings or passages into the tappet body.

An object of the invention is the provision of an effective and economical barrel type valve tappet.

Another object of the invention is the provision of a valve tappet of the barrel type comprising a cast iron body of hollow cylindrical shape closed at one end and with a socket brazed in its open end, provision being made along the brazing zone for permitting the escape of gases from the tappet body and the effective sealing of the socket in the body.

A further object of the invention is the provision of a barrel type tappet comprising a hollow cylindrical imperforate body closed at one end and open at its other end and an imperforate socket member adapted to be brazed to the body at the open end thereof providing at and between the surfaces to be brazed air and gas relief passages, said passages subsequently after the brazing operation being blocked by the brazing material from providing communication between the interior and the exterior of the tappet body such that all foreign matter is inhibited thereafter from entering the hollow in the tappet body.

A yet further object of the invention is the provision of a simple, economical and effective method of fabricating a barrel type tappet of lightweight construction such that the air and gases normally entrapped in the hollow of the tappet body can be released therefrom during the brazing of a socket to the tappet body and the hollow can be simultaneously sealed from the subsequent entry of foreign matter thereinto.

Other and further important objects and advantages of this invention will be apparent from the following description taken in connection with the drawings forming a part of the specification and in which.

Figure 1:
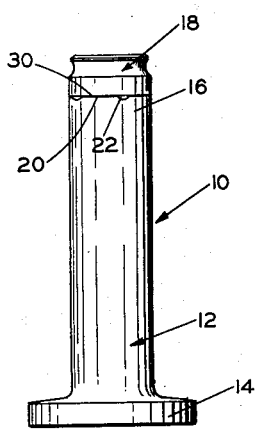
Fig. 1 is a vertical side plan view of a barrel type valve tappet incorporating the invention.
Figure 2:
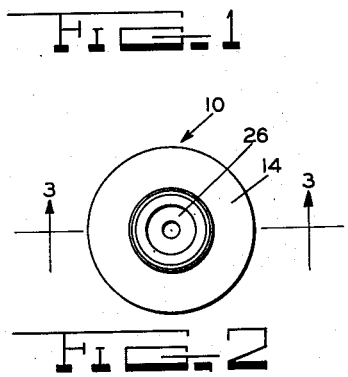
Fig. 2 is a top plan view of Fig. 1.
Figure 3:
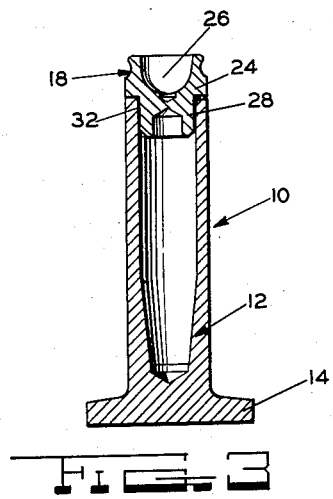
Fig. 3 is a vertical cross-sectional view of the tappet of Fig. 1 taken substantially along lines 3—3 of Fig. 2.
Figure 4:
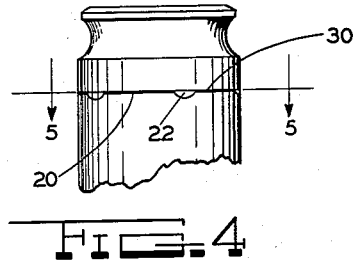
Fig. 4 is an enlarged fragmentary view of the body and socket assembly of the tappet.
Figure 5:
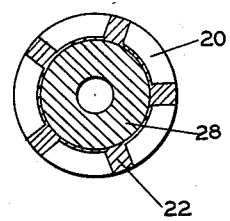
Fig. 5 is a horizontal cross-sectional view taken substantially along lines 5—5 of Fig. 4.

Referring to the drawings for more specific details of the invention 10 represents generally a valve tappet comprising a hollow cylindrical body 12 closed at one end in the form of a mushroom head 14 adapted to be engaged by a cam of an engine camshaft and open at its other end 16 and a socket member 18 brazed upon the open end of the body.

The end 16 of the tappet body terminates in a generally flat annular face 20 lying in a plane perpendicular to the axis of the body interrupted by a plurality of circumferentially spaced radial extending notches or slots 22 the purpose of which will hereinafter appear.

The socket member comprises a body portion 24 having a cavity 26 thereon for receipt of a valve push rod or the like, not shown, and a reduced portion 28 extending concentrically with and axially of the body portion 24 forming a flat annular shoulder 30 at the juncture therewith.

The reduced portion 28 of the socket member 18 is of a diameter less than that of the hollow in the body 12 of the tappet for receipt therein with annular clearance therebetween whereas the shoulder 30 lies in a plane similarly with the face 20 on the end of the tappet body for axial abutting assembly relation therewith.

The body is preferably made of cast iron with the head 14 thereof hardened and the socket of steel, although any of several combinations of different metals could be equally as well utilized.

In the brazing of the socket to the tappet body, the reduced portion of the socket is inserted into the hollow of the tappet body with an annular ring 36 of brazing material placed near the juncture of the shoulder 30 and the external surface of the reduced portion 28 of the socket member lying intermediate the juxtaposed faces of the shoulder and end of the tappet body. The assembly is then heated in proximity to the position of the brazing ring and an axial pressure is applied at opposite ends of the tappet upon the socket and mushroom head end of the body bringing the faces 20 and 30 respectively of the tappet body and socket into substantially abutting engagement. As the brazing material 32 becomes plastic, it flows into the clearance between the internal wall of the body and the external surface of the reduced portion of the socket and into the notches while at the same time permitting of the release of gases therethrough along the clearance space and the notches from the hollow in the tappet body. With the removal of the heat from the tappet and as the brazing material solidifies to effect a bond of the socket to the body primarily across the previously provided annular clearance between the socket and body, the brazing material seals off the hollow of the body to the exterior of the tappet thereby inhibiting the subsequent passage of foreign material thereinto.

Figure 7:
Fig. 7 is an enlarged fragmentary cross-sectional view of the tappet body and socket upon initial assembly together.
Figure 6:
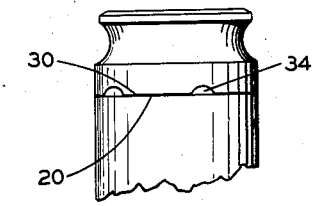
Fig. 6 is a modification of the tappet structure shown by Fig. 1 through 5.

Fig. 7 illustrates the step of placing the annular ring of brazing material intermediate the face and shoulder of the body and socket respectively with the ring nestled therebetween seated on a chamfered surface 38 at the annular inner surface of the face 20. The chamfer in addition to maintaining the socket and body in alignment preparatory to the brazing thereof together assists in the flow of molten brazing material along between the annular walls of the socket and body.

The notches 22 as can be seen in the assembly of the socket and body together provide a passageway between the respective abutting faces 20 and 30 communicating with the hollow in the tappet body along the space provided between the socket and inner wall of the body so that a positive uninterrupted opening is assured permitting of the easy escape of gases and air that might be present or generated in the hollow of the tappet body when the unit is brought up to a temperature sufficient to melt the brazing material 32 and allow for its flow between the socket and tappet body.

By providing the notches 22 the gases which might otherwise act upon the socket and tappet body attempting to push them apart along the joining faces 20 and 30 thereof in the brazing together are allowed to escape therethrough without disrupting the established height of the tappet determined by the substantial if not complete abutment of the faces 20 and 30 together.

The socket and body members are both rough finished prior to assembly such that after the brazing step is completed, it is just necessary that a finish clean up, machining, and polishing operation is required to bring the article to a condition ready for use.

While this invention has been described in connection with certain specific embodiments, the principle involved is susceptible of numerous other applications that will readily occur to persons skilled in the art. The invention, therefore, is limited only as indicated by the scope of the appended claims.

I claim:

1. An article of manufacture comprising a hollow cylindrical member closed at one end and open at its other end terminating at its open end in an annular face lying in a plane perpendicular to the axis of the member, said hollow cylinder being imperforate throughout its wall and closed end, an imperforate member in the open end of the cylindrical member having a portion received in the hollow thereof and an enlarged portion extending beyond the open end of the cylindrical member terminating with the other portion in an annular shoulder lying in a plane perpendicular to the axis thereof, said shoulder in axial abutting relation with the annular face of the cylindrical member with the provision of radial circumferential openings therebetween and brazing material annularly disposed between the external surface of second member and related internal surface of the cylindrical member and radially disposed in the radial openings between the members securing the two members together and providing a centrally closed cavity in the article.

2. An article of manufacture comprising a hollow cylindrical member closed at one end and open at its other end terminating in a flat annular face lying in a plane perpendicular to the axis of the member, said hollow cylinder having an imperforate radial wall and closed end, said face having a plurality of circumferentially spaced radial recesses therein, an imperforate cylindrical member arranged on the open end of the hollow member having a body portion of slightly less diameter than the hollow in the hollow member received in extended concentric relation in the hollow and an enlarged body portion extending axially externally of the hollow member forming at the juncture with the other portion thereof a flat annular shoulder received in axial abutting relation on the flat face of the hollow member, and brazing material received in the voids between the members securing the members together providing a closed cavity centrally of the article.

3. An article of manufacture comprising a solid walled hollow cylindrical member closed at one end and open at its other end terminating in a flat annular face lying in a plane perpendicular to the axis of the member, an imperforate cylindrical member arranged on the open end of the hollow member having a body portion of slightly less diameter than the hollow in the hollow member received in extended concentric relation in the hollow member and an enlarged body portion extending axially externally of the hollow member forming at the juncture with the other portion thereof a flat annular shoulder received in axial abutting relation on the flat face of the hollow member, said shoulder having a plurality of circumferentially spaced recesses therein, and brazing material received in the voids between the members securing the members together so as to provide a closed central cavity in the article.

4. A tappet comprising a solid walled hollow cylindrical body closed at one end terminating externally in a solid hardened cam engaging substantially planar surface and open at its other end terminating in a flat annular face lying in a plane perpendicular to the axis of the body interrupted in its annular path by a plurality of spaced radially extending recesses, a valve push rod receiving imperforate socket received in the open end of the body having a cylindrical portion of less diameter than the hollow in the body extending thereinto and an enlarged portion protruding axially beyond the open end of the body providing at the juncture with the other portion an annular shoulder lying in a plane perpendicular to the axis of the body abutting the face on the body and brazing material in the openings provided between the body and socket securing them together such as to provide a hollow imperforate body tappet.

5. A tappet comprising a solid walled hollow cylindrical cast iron body closed at one end terminating externally in a solid hardened cam engaging substantially planar surface and open at its other end terminating in a flat annular face lying in a plane perpendicular to the axis of the body interrupted in its annular path by a plurality of spaced radially extending recesses, a valve push rod receiving imperforate steel socket received in the open end of the body having a cylindrical portion of less diameter than the hollow in the body extending thereinto and an enlarged portion protruding axially beyond the open end of the body providing at the juncture with the other portion an annular shoulder lying in a plane perpendicular to the axis of the body abutting the face on the body and brazing material in the openings provided between the body and socket securing them together and providing a closed cavity centrally thereof.

6. A tappet comprising a hollow imperforate cylindrical body solidly closed at one end terminating externally in a cam contacting surface and open at its other end terminating in a flat annular face, an imperforate socket member adapted to be engaged by a valve push rod concentrically received in the open end of the body having a portion thereof in axial abutting relation to the flat face on the body and providing therewith radial openings extending from the exterior to the interior of the hollow body and brazing material bonding the socket in the body disposed in the radial openings and providing a closed cavity centrally in the tappet.

References Cited in the file of this patent

UNITED STATES PATENTS

| Number | Name | Date |
|---|---|---|
| 1,228,350 | Rich | May 29, 1917 |
| 1,330,913 | Short | Feb. 17, 1920 |
| 1,625,229 | Stollberg | Apr. 19, 1927 |
| 1,633,038 | Saives | June 21, 1927 |
| 1,991,582 | Sterling | Feb. 19, 1935 |
| 2,014,612 | Borton | Sept. 17, 1935 |
| 2,187,661 | Lochrane | Jan. 16, 1940 |
| 2,207,534 | Corlett | July 9, 1940 |
| 2,265,561 | Hoern | Dec. 9, 1941 |
| 2,430,010 | Geertsen | Nov. 4, 1947 |
| 2,467,079 | Corlett | Apr. 12, 1949 |